United States Patent Office 3,216,056
Patented Nov. 9, 1965

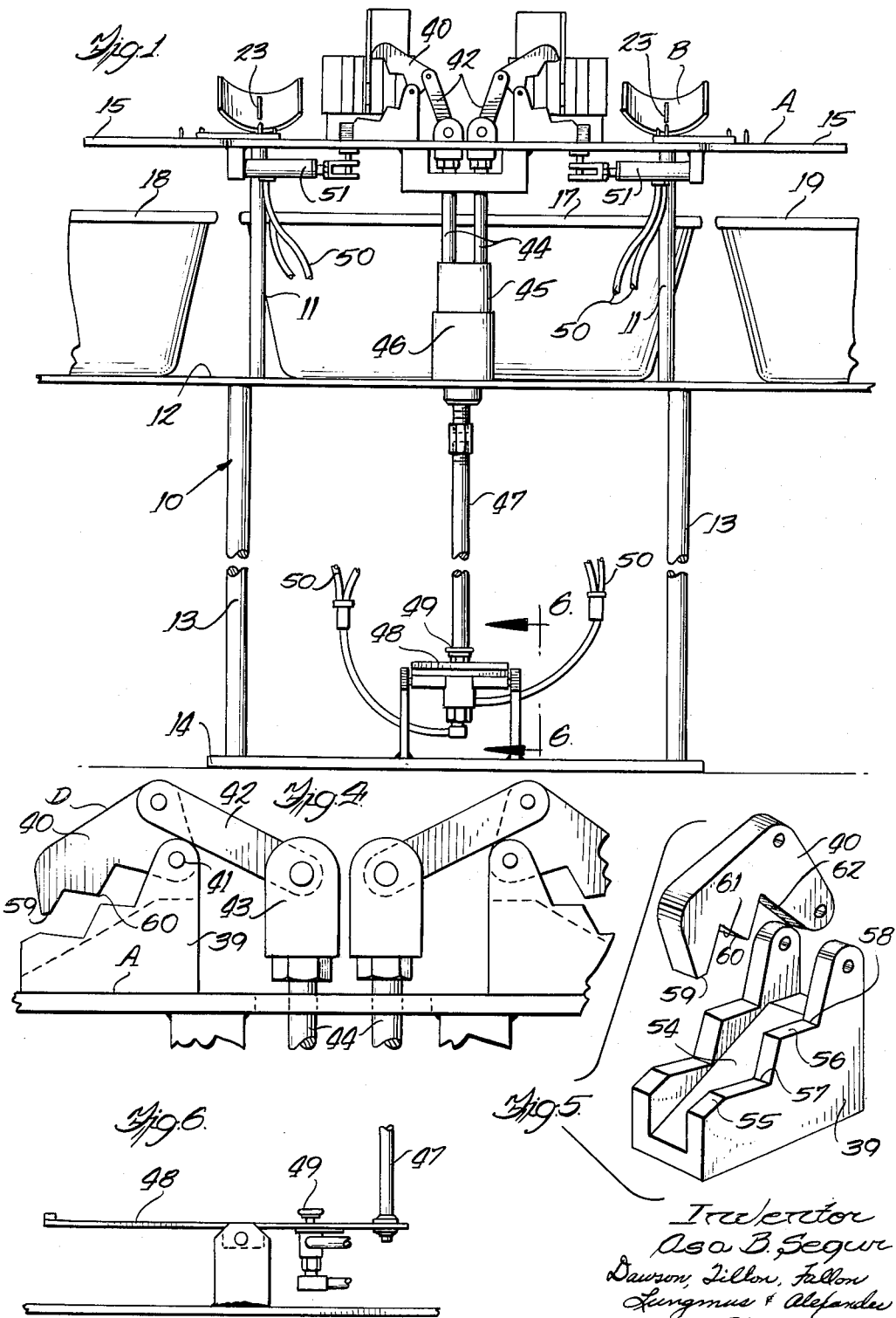

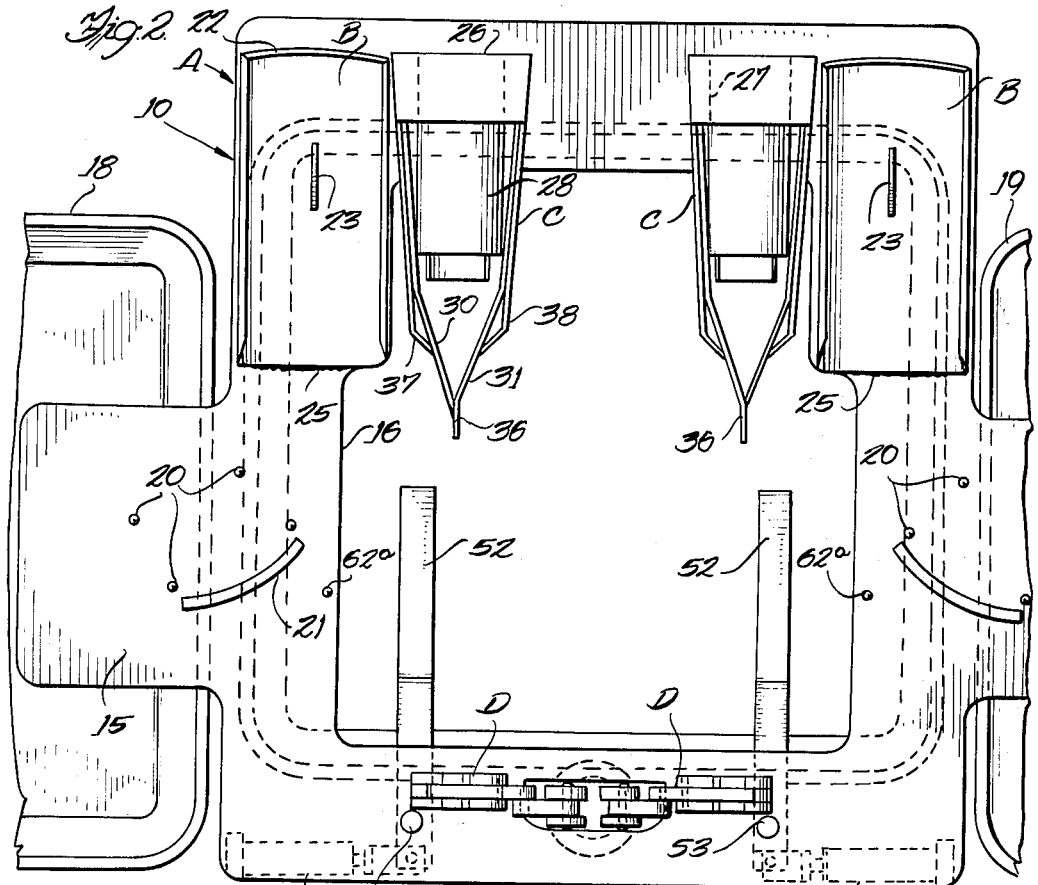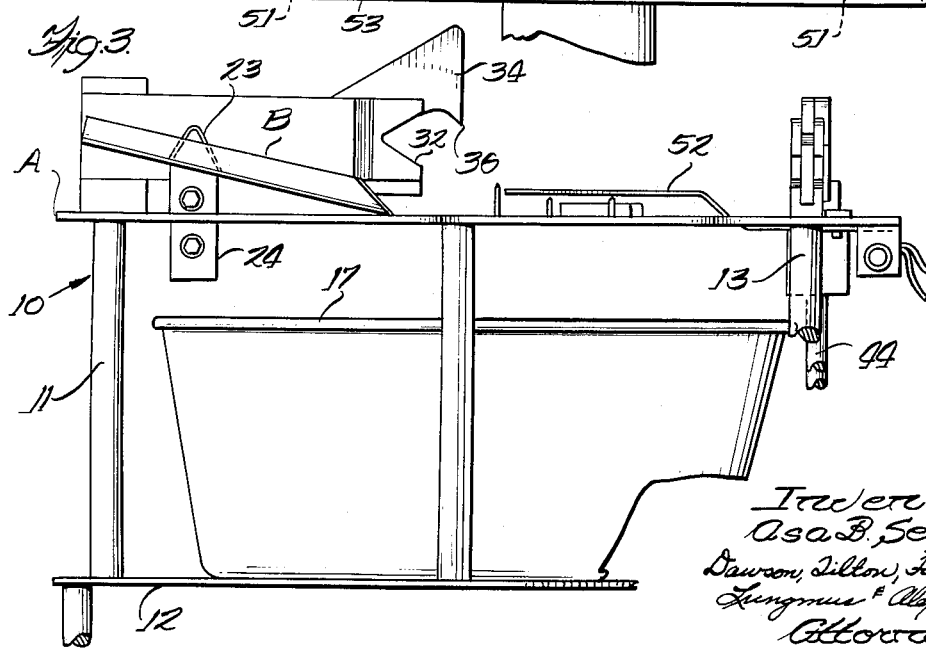

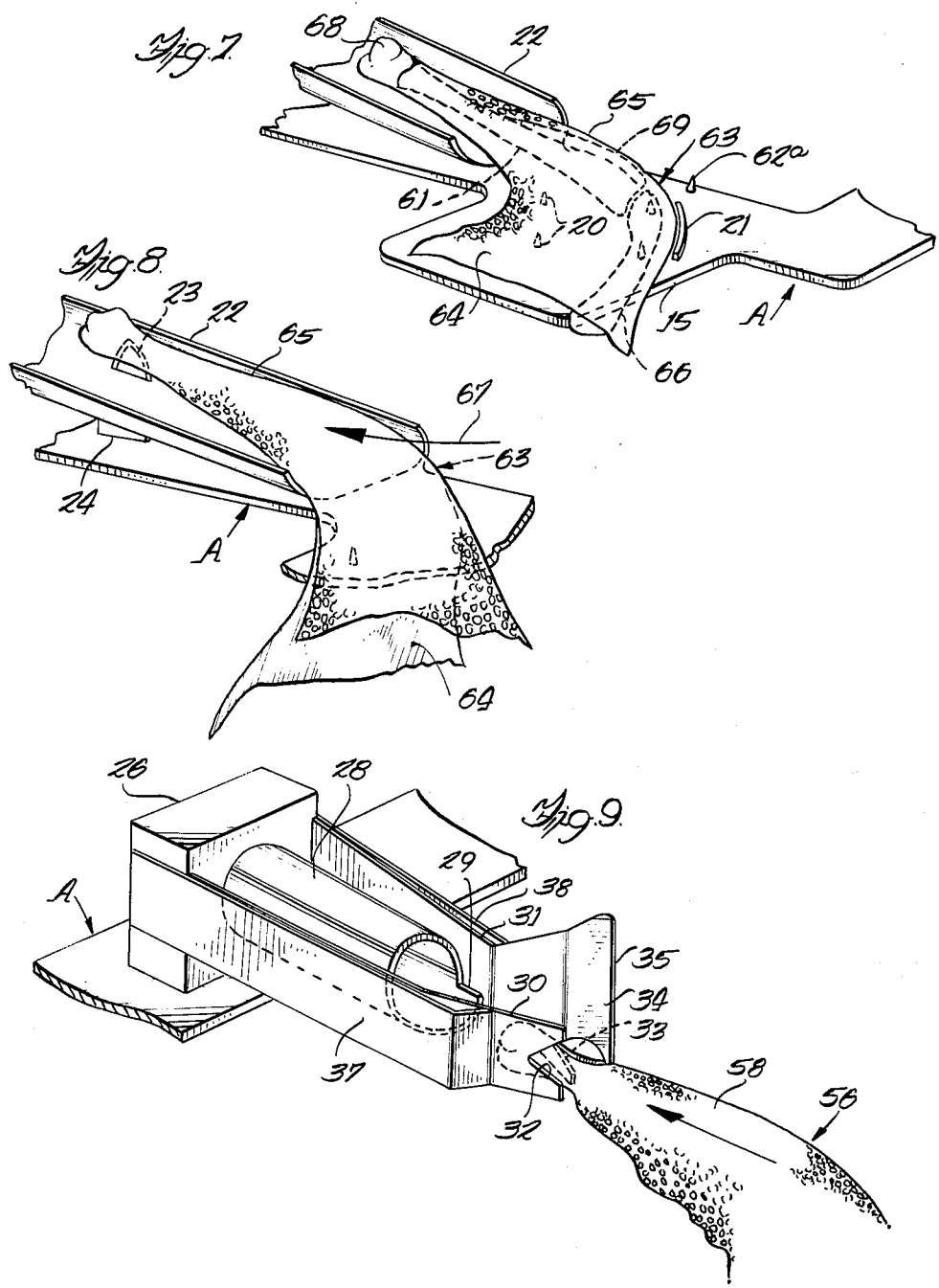

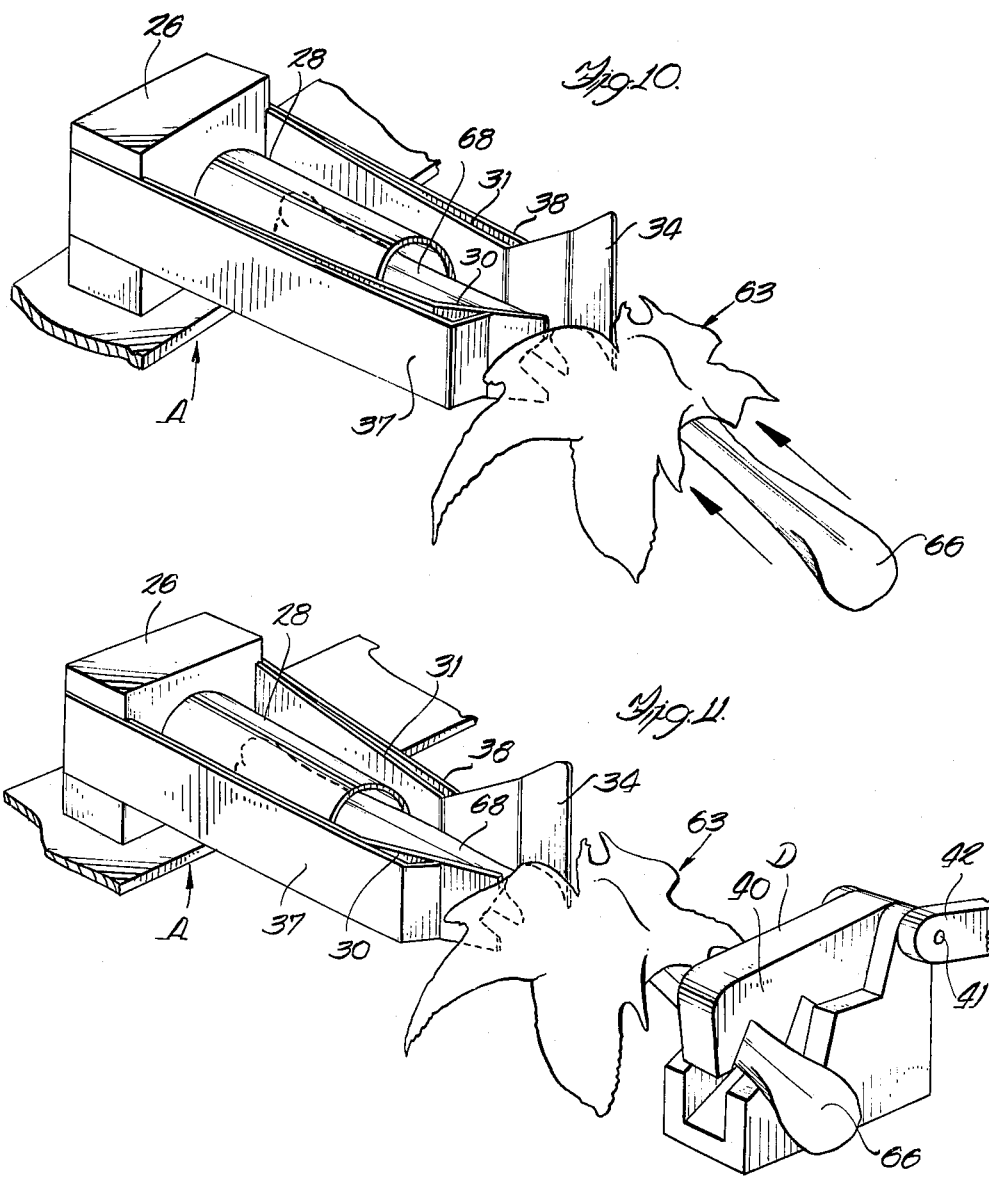

3,216,056
APPARATUS FOR REMOVING MEAT
FROM POULTRY LEGS
Asa B. Segur, 1185 S. Ridgeland Ave., Oak Park, Ill.
Filed Nov. 20, 1963, Ser. No. 325,104
10 Claims. (Cl. 17—1)

This invention relates to a meat removal apparatus, and more specifically, to a fixture for use in removing meat from the leg sections of poultry carcasses.

In my copending application, now Patent No. 3,099,858, issued August 6, 1963, I disclose a method and apparatus for dismembering and breaking apart poultry carcasses so that uniformity of procedure and a high speed of subsequent meat removal may be readily achieved. In the break-apart operation, a poultry carcass is securely clamped in position and its appendages are then removed therefrom. While the method and apparatus of the present application may be used in conjunction with poultry leg sections removed by other means and methods, it should be mentioned at the outset that this invention is particularly suitable for the removal of meat from poultry legs which have been removed in accordance with the teachings of said copending application.

An important object of the present invention is to provide a fixture for efficiently and rapidly removing meat from the jointed leg sections of poultry carcasses, said fixture being especially suited for use in commercial poultry processing plants where meat is removed from poultry carcasses for later use in the preparation of soups, meat pies, frozen dinners, and the like. Another object is to provide a fixture for quickly removing large sections of uncontaminated meat from poultry legs. In this connection, it is a specific object to provide an apparatus for removing leg meat without having such meat contaminated and thereby downgraded by the inclusion therewith of cartilage, bones and tendons. A further object of the present invention is to provide an apparatus whereby an operator may quickly and easily remove meat from a poultry leg (comprising connected upper and lower leg sections) by using only one hand, or, by using both hands, may remove meat from two legs at once.

Other objects will appear from the specification and drawings in which:

FIGURE 1 is a rear elevational view of an apparatus embodying the present invention;

FIGURE 2 is an enlarged top plan view of the apparatus;

FIGURE 3 is an enlarged side elevational view of the apparatus;

FIGURE 4 is a still further enlarged rear elevational view of the leg-clamping means, the clamps being shown in closed condition;

FIGURE 5 is an enlarged exploded perspective view of the leg clamping elements;

FIGURE 6 is a side elevational view of the foot control pedal taken along line 6—6 of FIGURE 1;

FIGURE 7 is a fragmentary perspective view illustrating the first step in the method of the present invention;

FIGURE 8 illustrates the commencement of the second step of slicing the meat along the underside of a poultry leg;

FIGURE 9 illustrates the commencement of a meat plowing step;

FIGURE 10 illustrates a leg after the meat has been plowed to the knee joint thereof;

FIGURE 11 illustrates a later step in which the leg bones are securely anchored in place to permit complete removal of the meat from the vicinity of the knee joint.

In the embodiment of the invention illustrated in the drawings, the numeral 10 generally designates an apparatus for use in removing meat from poultry legs, such apparatus consisting essentially of a stationary platform A, leg slicing means B mounted upon the platform, meat plowing devices C also mounted upon the platform, and leg clamping means D affixed to the platform in alignment with the plowing devices.

The platform A is supported by a plurality of standards 11 projecting upwardly from a pan support plate 12. The pan support plate is in turn mounted upon posts 13 attached to a base 14 which may be affixed to the floor or to any other suitable supporting surface.

The platform A extends along a horizontal plane and is of generally rectangular shape with a pair of lateral wing portions 15. Centrally, the platform is provided with a large opening 16 so that meat removed by the use of plowing devices C and by the manipulations performed on the legs above the level of the platform may drop downwardly into a suitable pan 17 supported by plate 12 directly beneath opening 16. As indicated in FIGURE 1, plate 12 is wider than platform A and also supports a pair of side pans 18 and 19 beneath and to each side of the platform.

As shown most clearly in FIGURES 2, 3 and 7, each wing portion 15 of the platform is provided with a plurality of upstanding barbs or pins 20 and an arcuate guide bar or member 21. The pins, which are shorter than the thickness of the meat along the inside or underside of the thigh, are spaced apart and are adapted to pierce the meat of the thigh so as to hold the poultry leg securely in place as the skin is being loosened thereon, an operation which will be described in greater detail shortly.

Spaced in front of the pins and guide bars are the paired meat slicing units B, each of which comprises a trough 22 and a slicing blade 23. The troughs each extend forwardly and upwardly and are held securely in place by brackets 24 with the rear edges of the troughs in contact with the surface of platform A. If desired, the lower edges of the troughs may be welded to the platform as indicated by the numeral 25 in FIGURE 2, thereby strengthening the mounting of the troughs as well as providing a smooth junction between the parts.

Within each trough is an upstanding and longitudinally-extending blade 23. In FIGURE 3 it will be seen that the blade tapers upwardly and is generally triangular in shape. Both its leading and trailing edges are sharpened so that the blade will pierce an object thrust downwardly upon it as well as slice that object when it is moved longitudinally along the trough.

The plowing devices C are illustrated most clearly in FIGURES 2, 3 and 9 and are disposed in spaced parallel relation upon platform A and just to the inside of troughs 22. Each device C comprises a mounting block 26 having a horizontal passage 27 extending therethrough. A tube 28 projects rearwardly from the block and has its forward end secured within passage 27. The open rear end of the horizontal tube is preferably provided with a rearwardly extending lower lip 29. To each side of the tube are a pair of rearwardly converging spring arms 30 and 31 and, in FIGURES 2 and 9, it will be seen that these spring arms meet along a vertical line spaced rearwardly from the end of guide tube 28. The free ends of the arms are notched, as designated by the numerals 32 and 33 and one of the arms, preferably the inside arm 31, may be provided with an upwardly and rearwardly projecting fin portion 34 having a sharpened rear edge 35 and a downwardly and rearwardly projecting beak 36. The sharpened beak facilitates the stripping of meat from opposite sides of a leg, as described hereinafter, but both the beak 36 and fin portion 34 may be eliminated and arm 31 may be formed substantially identical to arm 30 if removal of the lower leg meat in one piece is desired.

The arms 30 and 31 normally have their notched edge portions in contact with each other by reason of the spring tension of the arms. To increase this spring tension without increasing the thickness of the thin sheet metal arms 30 and 31, it may be desirable to provide additional spring means in the form of secondary springs 37 and 38. Like the spring arms, the secondary springs are formed of flexible material, preferably thin sheet stainless steel, and are affixed at their forward ends to the sides of mounting block 26. The rear ends of the secondary springs are turned inwardly and bear against the sides of the arms at spaced distances from the rear ends thereof. Thus, lateral separation of the notched edges of the spring arm is achieved only by outward or lateral flexure of those arms and of the secondary springs bearing thereagainst.

Like most of the other elements so far described, the clamping means D are provided as a pair, each clamping device being spaced longitudinally and rearwardly behind one of the plowing devices C. Each clamping device comprises a stationary clamping jaw 39 and a movable jaw 40, the two jaws of each pair facing laterally or outwardly and being hingedly connected together by horizontal pin 41. The lower jaw 39 is permanently attached to the platform. A link 42 extends from the pivotal upper jaw 40 to a yoke 43 provided by the upper end of vertical shaft 44, the lower end of the shaft being affixed to a slide member 45, which is carried for vertical movement in fitting 46 and which is joined at its lower end to shaft 47. A foot pedal 48 is operatively connected to the shaft so that when the rear portion of the pedal is depressed the movable jaws will pivot outwardly and downwardly into their closed positions (FIGURE 4). A suitable spring (not shown) within fitting 46 returns the shaft 47 to its normally lowered position when pressure on the pedal is removed.

At the front end of pedal 48 is a toe button 49 which upon depression permits air to flow through conduits 50 to actuate air cylinders 51 and to pivot horizontally swingable support arms 52 outwardly about their pivot pins 53 (FIGURE 2). Upon release of button 49, the arms return to the positions illustrated in FIGURE 2, wherein such arms extend forwardly within opening 16 and towards plowing devices C along substantially the same plane as platform A.

Referring to FIGURE 5, it will be noted that the lower jaw 39 has a downwardly and outwardly sloping channel 54 and that to each side of this channel are a pair of projections 55 and 56 defining notches or recesses 57 and 58. The movable upper jaw 40 is adapted to move in a vertical plane passing through the channel of the lower jaw and is similarly provided with teeth or projections 59 and 60 which define notches or recesses 61 and 62. Furthermore, the notches of the upper and lower jaws are arranged in opposition to define a pair of openings formed by the complementary jaws when those jaws are closed.

Projecting upwardly from the platform on each side of opening 16 is a holding pin 62a, similar to pins 20, for holding the legs in place during a skin removing step, as described hereinafter.

The apparatus of the present invention is particularly suited for use in connection with the removal of meat from the legs of cooked or partially cooked poultry. Such legs consist of connected upper and lower leg sections; that is, the upper leg sections or thighs have not been disjointed from the lower leg sections. However, the legs do not include the feet since it is presumed that the feet and heads are removed during a preliminary eviscerating operation.

In the break-apart operation disclosed in my copending application Serial No. 27,093, filed May 5, 1960, now Patent No. 3,099,858, the legs from the right and left sides of poultry carcasses are detached and placed in separate pans. When these pans are filled, they are brought to the station for the removal of meat from legs contained therein, the pan containing left legs assuming the position of pan 18 and the pan containing rights legs assuming the position of pan 19. The operator reaches into both pans simultaneously, picking up a left leg in his left hand and a right leg in his right. Then, using the fixture of the present invention in the manner hereafter described, the operator proceeds to remove the meat from both legs at the same time. Since the operations performed in removing the meat are identical for both legs, only the removal of meat from a left leg will be described in detail herein.

As a first step in the method of the present invention, a poultry leg 63 is placed upon a wing 15 of platform A so that the outer or lateral surface of the leg faces upwardly and the free end of the upper leg or thigh portion 64 extends outwardly (FIGURE 7). The lower leg portion 65 projects forwardly and the knee of the leg (which normally is in approximately a right angle bend) bears against arcuate guide bar 21.

The operator, with the flat of his hand, urges the skin of the thigh portion in a circular horizontal path to break the tissue connections between that skin and the meat underneath it without completely removing that skin from the leg. In some cases, a small piece of meat will be found clinging to the proximal end of the femur 66, and such meat may be twisted off and dropped into the central pan 17 to expose the free end of that bone. During the skin loosening step, and during the removal of any meat which clings to the enlarged free end of the femur, upstanding pins or stakes 20 hold the leg securely in place.

Next, the operator places the free end of the lower leg section downwardly into the trough 22 and directly upon blade 23 so that the blade pierces the meat to the bone (FIGURE 8). The leg is then slid longitudinally forwardly in the direction of arrow 67 so that the underside of both the lower and upper sections of the leg are sliced longitudinally to the bone. In this step, as well as in all other steps in the operation of removing meat from poultry legs, it is preferred that the operator wear protective wire mesh gloves of the type disclosed in my copending application, Serial No. 73,112, filed December 1, 1960, now abandoned. Such gloves facilitate the gripping of the legs and the meat thereof and protect the wearer's hands from injury by blades 23 and plowing devices C.

After the meat has been sliced longitudinally along the underside of the leg, the free end of the lower leg section 65 is thrust downwardly between the arms 30 and 31 of the plowing device C to separate the free ends of such arms and thereby permit the end of the leg to drop downwardly into the opening defined by notches 32 and 33 (FIGURE 9). The spring arms grip the distal end of the tibiotarsus 68, the principal bone extending through the lower leg section 65, and the upper leg section or thigh 64 rests upon the holding pin 62a of platform A. With the leg so anchored in position the operator peels away the loosened skin thereon and places it in a suitable pan or receptacle (not shown). Then, gripping the leg by the exposed proximal end of the femur 66, the operator straightens the leg and urges it forwardly so that the tibiotarsus 68 and fibula 69 pass forwardly through the opening defined by notches 32 and 33. As the leg is thrust forwardly, the sharpened beak 36 pierces the meat along the topside of the lower leg section and cuts it to the bone. The ends of the spring arms then plow the sliced meat away from the lower leg bones. Since the meat has previously been sliced along the underside of the leg (by blade 23), and since it is sliced along the topside by beak 36, the meat is readily pried or plowed off of the bones of the lower leg section 65.

As previously mentioned, beak 36 may be eliminated if it is considered important to remove the leg meat in substantially one piece. The sharpened beak, by slicing the skin and meat along the topside of the leg, facilitates the plowing operation and permits the notched arms to strip the meat from opposite sides of the lower leg; however, such arms are effective in removing the meat from the lower leg bone even when the meat and skin are sliced only along the underside of the leg. While the lower leg meat might be plowed without any slicing or splitting at all, the slicing of the skin and meat along the underside of the leg is important to insure proper removal of the skin and meat. It it were not split along the underside, the skin would be difficult to remove, particularly from the bottom of the leg and from about the knee joint. Also, there would be no uniformity in the separation of the meat. The slicing of the meat along the underside of the leg controls the separation or splitting of the meat and permits its removal in one or two pieces rather than in many small pieces.

At the commencement of the slicing and plowing step, the leg is held by the operator at the free end of femur 66. During such step, as the leg is thrust forwardly between the spring arms, the operator allows his fingers to slide forwardly along the femur 66 from the free end to the connected end thereof, with the result that meat is plowed in opposite directions along the respective leg sections and towards the knee joint (FIGURE 10).

The operator then inserts the free end of femur 66 between the open jaws 39 and 40 of the clamping device D and, by manipulating pedal 48, closes the jaws and clamps the femur tightly in position.

During and immediately following the plowing step, and as each leg is being straightened for clamping, the support arms 52 which extend beneath each leg assists in maintaining it in horizontal condition and prevents it from flexing downwardly into central opening 16. After the leg is clamped in position, such supports are no longer needed and in fact might interfere with the subsequent meat removal step. Therefore, upon depression of pedal 48 and toe button 49, air cylinders are actuated and the support arms swing laterally into retracted positions beneath platform A. As shown in FIGURE 11, the bone of the upper and lower leg sections are thereby held by the clamp D and by plowing device C in longitudinal alignment. The plowing device contributes significantly in holding the leg securely in position for the final meat removal step.

At this stage, substantially all of the meat of the leg is collected about the knee joint at a point spaced rearwardly from the ends of the plowing arms 30 and 31. The operator simply grips the meat between his fingers and with a twisting upward motion disconnects the meat from the bones at the knee joint, and drops it into pan 17. Since the bones are clamped securely in place, they will remain stationary as the meat is pulled therefrom. In this connection, it is particularly significant that the bones are held securely in place and that the leg is locked against flexure, since movement of the leg bones and flexure of the knee joint during the final step of removing the plowed meat would tend to result in removal of cartilage with the meat, thereby resulting in a substantially lower grade of meat than that obtained by use of the present method and apparatus.

While in the foregoing I have disclosed an embodiment of the invention in considerable detail for purposes of illustration, it will be understood by those skilled in the art that many of these details may be varied without departing from the spirit and scope of the invention.

I claim:

1. In a fixture for removing meat from poultry leg sections, a plowing device comprising a pair of horizontally-elongated spring arms arranged in side-by-side relation, said arms having rigidly-mounted forward ends in laterally-spaced relation, said arms converging rearwardly and having free rear ends with mutually contacting rear edges, and means disposed between said spring arms at the forward ends thereof for rigidly supporting the same, said arms being provided with complementary notches at the free rear ends thereof defining an opening of a size approximating the cross-sectional dimensions of a leg bone to be thrust longitudinally therethrough, said free rear ends being capable of flexing outwardly to follow the bone contour of a poultry leg and to plow meat therefrom as a leg is urged forwardly therebetween.

2. The structure of claim 1 in which said plowing device is mounted upon a horizontal platform having a large opening therein, said arms of said plowing device projecting rearwardly over said platform opening.

3. The structure of claim 1 in which clamping means are spaced rearwardly from said plowing device and in longitudinal alignment therewith for clamping another section of a leg gripped by said spring arms, said clamping means and said plowing device together coacting to hold a poultry leg in place.

4. In a fixture for removing meat from poultry leg sections, a plowing device comprising a pair of horizontally-elongated spring arms arranged in side-by-side relation, said spring arms having rigidly-mounted forward ends disposed in laterally-spaced relation, said arms converging rearwardly and having free rear ends provided with complementary notches in the rear edges thereof for receiving and engaging the bone structure of the lower section of a poultry leg, said free rear ends of said arms being capable of flexing outwardly to follow the bone contour of a poultry leg and to plow meat therefrom as a leg is urged forwardly therebetween, a clamping device spaced rearwardly from the free ends of said arms and disposed in longitudinal alignment therewith for clamping the bone of the upper section of said poultry leg, said clamping device comprising a pair of separable jaws movable with respect to each other between open and closed positions, and means for selectively opening and closing said jaws.

5. In a fixture for removing meat from poultry leg sections, a plowing device comprising a pair of horizontally-extending and rearwardly-converging spring arms having free rear ends provided with mutually contacting rear edges, and means disposed between said spring arms at the forward ends thereof for rigidly supporting the same, said arms being provided with complementary notches at the free rear ends thereof defining an opening of a size approximating the cross-sectional dimensions of a leg bone to be thrust longitudinally therethrough, one of said arms being provided at its free rear end with a sharpened beak projecting transversely beyond the free edge of the other of said arms to slice meat from a bone thrust longitudinally between the notched ends of said arms.

6. In a fixture for removing meat from poultry leg sections, a plowing device comprising a pair of horizontally-elongated spring arms arranged in side-by-side relation, said arms having rigidly-mounted forward ends disposed in laterally-spaced relation, said arms converging rearwardly and having free rear ends provided with complementary notches in the rear edges thereof for receiving and engaging the bone structure of the lower section of a poultry leg, a clamping device spaced rearwardly from the free ends of said arms and disposed in longitudinal alignment therewith for clamping the bone of the upper section of said poultry leg, said clamping device comprising a pair of separable jaws movable with respect to each other between open and closed positions, and means for selectively opening and closing said jaws, one of said spring arms being provided with a sharpened beak extending longitudinally and transversely beyond the free end of the other of said jaws for slicing the meat on said bone structure as the same is thrust longitudinally through the opening defined by said complementary notches.

7. In a fixture for removing meat from poultry leg sections, a plowing device comprising a pair of horizontally-elongated spring arms arranged in side-by-side relation, said arms having rigidly-mounted forward ends disposed in laterally-spaced relation, said arms converging rearwardly and having free rear ends provided with complementary notches in the rear edges thereof for receiving and engaging the bone structure of the lower section of a poultry leg, a clamping device spaced rearwardly from the free ends of said arms and disposed in longitudinal alignment therewith for clamping the bone of the upper section of said poultry leg, said clamping device comprising a pair of separable jaws movable with respect to each other between open and closed positions, and means for selectively opening and closing said jaws, said jaws being provided with complementary notches defining at least one recess when said jaws are closed for receiving and securely holding the bone of an upper leg section therebetween.

8. In a fixture for removing meat from poultry leg sections, a plowing device comprising a pair of horizontally-elongated spring arms arranged in side-by-side relation, said arms having rigidly-mounted forward ends disposed in laterally-spaced relation, said arms converging rearwardly and having free rear ends provided with complementary notches in the rear edges thereof for receiving and engaging the bone structure of the lower section of a poultry leg, a clamping device spaced rearwardly from the free ends of said arms and disposed in longitudinal alignment therewith for clamping the bone of the upper section of said poultry leg, said clamping device comprising a pair of separable jaws movable with respect to each other between open and closed positions, and means for selectively opening and closing said jaws, one of said jaws being provided with a longitudinal channel and the other of said jaws being of a width substantially the same as that of said channel and being movable in a plane passing through said channel, whereby said jaws engage the bone of an upper leg section at different points along the longitudinal extent thereof for securely clamping a bone in place.

9. In a fixture for removing meat from poultry leg sections, a plowing device comprising a pair of horizontally-elongated spring arms arranged in side-by-side relation, said arms having rigidly-mounted forward ends disposed in laterally-spaced relation, said arms converging rearwardly and having free rear ends provided with complementary notches in the rear edges thereof for receiving and engaging the bone structure of the lower section of a poultry leg, a clamping device spaced rearwardly from the free ends of said arms and disposed in longitudinal alignment therewith for clamping the bone of the upper section of said poultry leg, said clamping device comprising a pair of separable jaws movable with respect to each other between open and closed positions, and means for selectively opening and closing said jaws, said fixture also including a trough having an upstanding and longitudinally-extending blade therein for slicing the meat of a poultry leg longitudinally as said leg is urged along said trough.

10. The structure of claim 9 in which said upstanding blade tapers upwardly and is generally triangular in shape, said blade having both the leading and trailing edges thereof sharpened.

References Cited by the Examiner

UNITED STATES PATENTS

| 2,785,434 | 3/57 | Terranova | 17—1 |
| 2,844,844 | 7/58 | Sieczkiewicz | 17—45 |
| 2,893,051 | 7/59 | Massengill | 17—1 |
| 2,897,536 | 8/59 | Bergstrom et al. | 17—1 |
| 3,099,858 | 8/63 | Segur | 17—45 |
| 3,104,418 | 9/63 | Segur | 17—11 |

SAMUEL KOREN, *Primary Examiner.*

LUCIE H. LAUDENSLAGER, *Examiner.*